United States Patent

[11] 3,588,793

[72] Inventors Colin David Kindell
 Bushey;
 Terence Robert Raynor, Chingford,
 London, England
[21] Appl. No. 811,040
[22] Filed Mar. 27, 1969
[45] Patented June 28, 1971
[73] Assignee AMP Incorporated
 Harrisburg, Pa.
[32] Priority Mar. 29, 1968
[33] Great Britain
[31] 15321/68

[54] PANEL MOUNT WEDGE CONNECTOR
 6 Claims, 4 Drawing Figs.
[52] U.S. Cl. .................................................. 339/276,
 24/73, 85/8.3, 85/85
[51] Int. Cl. ........................................ H01r 11/08
[50] Field of Search ........................................ 339/220
 (C), 273 (F), 276 (T); 24/73 (BMF), (RMF),
 (Inquired); 85/8.1, 8.3, 37, 85, (Inquired)

[56] References Cited
 UNITED STATES PATENTS
| | | | |
|---|---|---|---|
| 1,031,431 | 7/1912 | Dunn | (85/37UX) |
| 1,336,162 | 4/1920 | Royer et al. | (85/37UX) |
| 1,548,688 | 8/1925 | Johnson | 85/8.1 |
| 2,198,186 | 4/1940 | Tinnerman | (24/73BMFUX) |
| 2,286,988 | 6/1942 | Jones | (24/73BMFUX) |
| 2,436,756 | 2/1948 | Larkin | (85/37UX) |
| 2,462,867 | 3/1949 | Hubbell | 339/276(T)X |
| 2,559,737 | 7/1951 | Schaefer | 85/8.1 |
| 2,587,789 | 3/1952 | Talmadge et al. | 339/220(C)X |
| 2,748,645 | 6/1956 | Peckham et al. | 85/85 |

FOREIGN PATENTS 556,551 2/1957 Italy ............................. 85/8.3

OTHER REFERENCES

Cioffi; J. M. et al. Wire Barrel Connector. I.B.M. Tech. Discl. Bull. 8(10), Mar. 1966, P. 1328. (Copy in 339-276)

Primary Examiner—Ian A. Calvert
Attorneys—Curtis, Morris and Safford, Marshall M. Holcombe, William Hintze, William J. Keating, Frederick W. Raring, John R. Hopkins, Adrian J. La Rue and Jay L. Seitchik ABSTRACT: A panel connector, for example for a grounding connection, has a crimping ferrule and a hairpin bend arranged for insertion through a panel aperture. One limb of the hairpin is bent back for entry between the limbs and on driving the bent-back portion between the limbs the hairpin is secured in the panel aperture by wedge action.

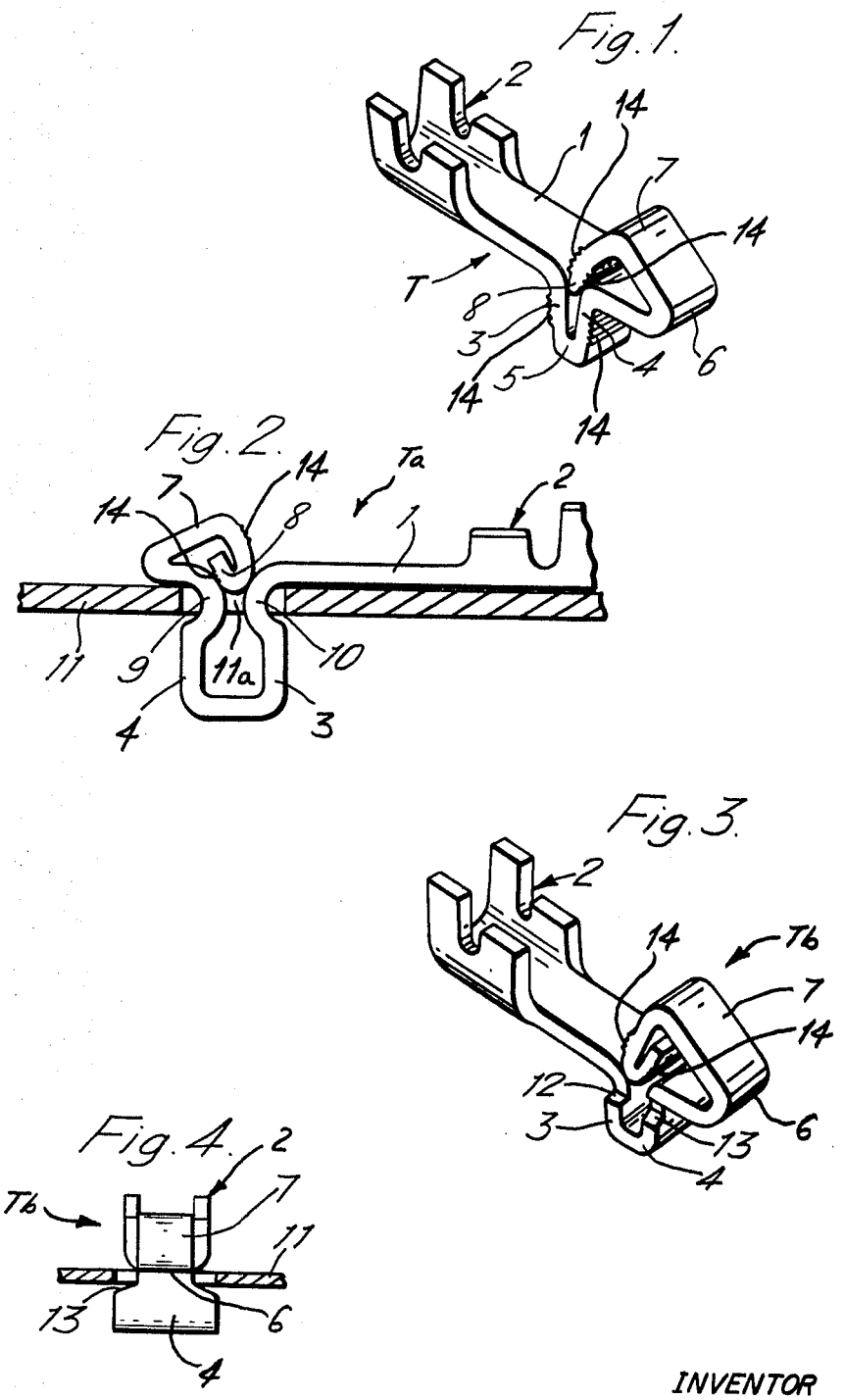

PANEL MOUNT WEDGE CONNECTOR

SPECIFICATION

The invention is concerned with a connector or fastener for insertion into an aperture in a support.

According to the invention, a connector or fastener for insertion into an aperture in a support is formed from sheet metal and includes an anchoring portion comprising an elongate member turned upon itself to form spaced leg portions for insertion into the aperture, one of the leg portions including a foot portion bent for wedging insertion between the spaced leg portions.

The invention also includes an assembly of a connector or fastener according to the invention inserted in an aperture in a support.

Preferably and according to an object of the invention, the invention is used as an electrical terminal to connect circuit wiring to a metal plate or panel forming a chassis for circuit components and is formed as an extension of a ferrule for crimping to an electrical conductor.

Suitably and according to another object, the terminal is formed from a sheet metal blank of generally T-form, in which the ends of the head of the T are bent toward each other to form a ferrule portion for crimping connection to an electrical conductor, and the base of the T is bent adjacent its free end to provide a U-shaped projection and the free end of the base is bent back to provide a V-shaped member to overlie the space between the leg portions of the U-shaped projection and the V-shaped member has a foot portion to be driven between them to urge them apart.

Another object is that the knee portions of the spaced leg portions may be bent toward each other to constrict the gap between them or shoulders may be cut in these knee portions.

A further object is that transverse serrations may be formed in the outer surfaces of the leg portions to facilitate engagement with the edges defining the aperture in the support.

An additional object is that the tip of the foot portion for wedging between the leg portions may be bent upon itself to a double thickness to enhance the wedging effect; serrations may be formed on the surface at its tip end.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration in order that others skilled in the art may fully understand the invention and the principles thereof and the manner of applying it in practical use so that they may modify it in various forms, each as may be best suited to the conditions of a particular use.

The invention will be described by way of example, with reference to the partly diagrammatic drawings, in which:

FIG. 1 is a perspective view of one embodiment of terminal according to the invention;

FIG. 2 is a side elevation of a second embodiment of terminal according to the invention, positioned in an aperture in a panel support;

FIG. 3 is a perspective view of a third embodiment of terminal according to the invention; and FIG. 4 is a front end view of the terminal of FIG. 3 positioned in an aperture in a panel support.

The terminal T in FIG. 1 is formed from a generally T-shaped sheet metal blank having an elongate straight-sided strip portion 1, constituting the base of the T, and formed at one end with lateral ears which are folded toward each other to define a U-section ferrule portion 2 for crimping connection to an electrical conductor (not shown). The strip portion 1 forms a continuation of one side of the base of the ferrule portion 2 and is the precursor of the anchoring portion of the fastener according to the invention. At a zone spaced from the ferrule portion 2, the strip portion 1 is bent into generally U-form to define spaced leg portions 3 and 4 extending downwardly from the strip portion 1 and connected by a bridge portion 5. The strip portion continues beyond the leg portion 4 in generally coplanar relation with the part of the strip intermediate the ferrule portion 2 and the limb 3 to define a foot portion which is bent back as at 6 in an upwardly inclined manner, away from the leg portion 4 and towards the ferrule portion 2. The bent back continuing portion is then bent downwardly as at 7, towards the bridging portion 5 and ends in a foot portion 8. The tip of foot portion 8 is tapered to blade-form to facilitate its forced insertion between the leg portions 3 and 4. Transversely extending serrations 14 are cut in the outer surfaces of the leg portions 3 and 4 and also in the tapered surfaces of the foot portion 8. The serrations can be formed such that leading surfaces are tapered and trailing surfaces are normal to the surfaces of the leg portions and foot portion; this configuration providing excellent retention characteristics. The width of the foot portion 8 is dimensioned relative to the space between the leg portions 3 and 4 so as to be a wedge fit when it is forcefully inserted between the leg portions 3 and 4. The strip 1 between the leg portion 3 and the ferrule portion 2 is sufficiently elongated to avoid damage to the ferrule by the means applying force to drive the foot portion 8 between the leg portions.

In use, the ferrule portion 2 is crimped to the stripped end of the conductor wire (not shown) and the spaced leg portions 3 and 4 are positioned in an aperture in a panel, the elongate areas of the strip portion 1 on each side of the leg portions abutting the upper surface of the panel. Force, suitably by a hammer or other driving means, is applied to the bent back continuing portion between bent portions 6 and 7 to drive the foot portion 8 between the leg portions 3 and 4 to force them apart into tight wedging engagement with the sides of the panel aperture. If the panel aperture is of circular section, the outer corners of the leg portions 3 and 4 engage edges of the panel aperture. Where the terminal is used to ground a conductor to a chassis, the serrations on the outer surfaces scrape the areas of engagement with the aperture wall to make good electrical contact with the wall defining the aperture and to enhance securing the terminal in the aperture.

In the embodiment of FIG. 2, the knees or inwardly directed sections 9 and 10 of the leg portions 3 and 4 respectively of terminal Ta are bent toward each other to constrict the gap between the spaced legs in that region. The foot portion 8 is bent back upon itself to a double thickness to provide two legs and each leg has serrations 14 thereon. On driving the foot portion 8 between the knees 9 and 10, they are forced apart and into engagement with the sides of the aperture 11a in a panel 11.

The embodiment of FIGS. 3 and 4 differs from that of FIG. 2 in that the knee portions 9 and 10 of terminal Tb are provided with shoulders 12 and 13 respectively. This embodiment can be used with a support, the aperture of which is elongate and narrower than the width of the leg portions 3 and 4. The legs 3 and 4 are inserted parallel to the longer axis of the aperture and then the fastener is turned through 90° so that the shoulders 13 and 14 underlie the edges of the panel aperture 11 (FIG. 4). The fastener may be dimensioned so that the shoulders engage the underside of the edges of the panel aperture instead of underlying them. The foot portion of this embodiment may be hammered or otherwise driven between the leg portions 3 and 4 in the same manner described for the other embodiments.

The fastener of this invention may be used to ground an electrical conductor to a grounding panel, for example, an automotive chassis. It may also be used to unite two panels having aligned apertures by suitably dimensioning the length of the spaced leg portions to pass through the aperture in the first panel and to penetrate the aperture in the lower one.

It will, therefore, be appreciated that the aforementioned and other desirable objects have been achieved; however, it should be emphasized that the particular embodiments of the invention, which are shown and described herein, are intended as merely illustrative and not as restrictive of the invention.

We claim:

1. An electrical connector comprising a strip portion formed of conductive material, an anchoring portion extending from said strip portion and having leg portions joined together by a bridge portion whereby said anchoring portion is of substantially U-shaped configuration, a substantially V-shaped extension extending outwardly from the outer one of said leg portions and terminating in a foot portion, said foot portion being disposed in alignment with an entrance to said U-shaped anchoring portion and operative to move said leg portions away from each other upon said foot portion being forcefully driven into said entrance, and ferrule means provided by said strip portion for connection with electrical conductor means.

2. An electrical connector according to claim 1 wherein the outer surfaces of said leg portions have lateral serrations.

3. An electrical connector according to claim 1 wherein said foot portion is provided with lateral serrations.

4. An electrical connector according to claim 1 wherein inner ends of said leg portions adjacent said entrance have inwardly directed sections.

5. An electrical connector according to claim 1 wherein said foot portion is bent providing a double thickness.

6. An electrical connector according to claim 1 wherein shoulders are provided in said leg portions substantially parallel to a tip of said foot portion.